United States Patent
Shibue et al.

(10) Patent No.: US 11,358,455 B2
(45) Date of Patent: Jun. 14, 2022

(54) DEFLECTOR DEVICE

(71) Applicant: Webasto SE, Stockdorf (DE)

(72) Inventors: Toru Shibue, Hiroshima (JP); Kazuki Kakihara, Hiroshima (JP)

(73) Assignee: WEBASTO SE, Stockdorf (DE)

( * ) Notice: Subject to any disclaimer, the term of this patent is extended or adjusted under 35 U.S.C. 154(b) by 0 days.

(21) Appl. No.: 15/734,123

(22) PCT Filed: Jul. 4, 2019

(86) PCT No.: PCT/EP2019/067947
§ 371 (c)(1),
(2) Date: Dec. 1, 2020

(87) PCT Pub. No.: WO2020/011632
PCT Pub. Date: Jan. 16, 2020

(65) Prior Publication Data
US 2021/0206249 A1    Jul. 8, 2021

(30) Foreign Application Priority Data

Jul. 11, 2018 (JP) .............................. JP2018-131647

(51) Int. Cl.
*B60J 7/22* (2006.01)
(52) U.S. Cl.
CPC ..................... *B60J 7/22* (2013.01)
(58) Field of Classification Search
CPC .. B60J 7/22; B60J 7/043; B62D 37/00; B62D 37/02; B62D 35/00
USPC ....................................................... 296/217
See application file for complete search history.

(56) References Cited

U.S. PATENT DOCUMENTS

| 9,987,910 B2 | 6/2018 | Kamioka |
| 2008/0246306 A1 | 10/2008 | Oerke et al. |
| 2013/0249255 A1* | 9/2013 | Sawada ..................... B60J 7/22 296/217 |

FOREIGN PATENT DOCUMENTS

| CN | 203 1 72 404 U | 9/2013 | |
| CN | 206734037 U * | 12/2017 | ................ B60J 7/22 |
| DE | 10 2011 018288 A1 | 10/2012 | |
| WO | 2007/054083 A1 | 5/2007 | |
| WO | 2016/035455 A1 | 3/2016 | |

OTHER PUBLICATIONS

Wang et al., "Automobile-used vortex device and skylight", Dec. 12, 2017, Chinese Patent Office, Edition: CN206734037U (Year: 2017).*

(Continued)

*Primary Examiner* — Dennis H Redder
*Assistant Examiner* — Joyce Eileen Hill
(74) *Attorney, Agent, or Firm* — Fitch, Even, Tabin & Flannery, LLP

(57) ABSTRACT

A deflector device capable of holding a mesh support across a straight portion and a corner portion of a holding member without a through-hole being formed in the corner portion of the holding member. A corner-side recess, which receives a hook portion and is formed as a concavity in which a cross-sectional shape perpendicular to a direction of extension of a corner portion is open on a lower side, is formed in said corner portion. A pair of facing inside surfaces of the corner-side recess are configured to pinch and hold the hook portion.

3 Claims, 10 Drawing Sheets

(56) References Cited

OTHER PUBLICATIONS

International Search Report for PCT/EP2019/067947 dated Nov. 13, 2019 in English (4 pages).
Written Opinion of the ISA for PCT/EP2019/067947 dated Nov. 13, 2019 in English (5 pages).

* cited by examiner

DEFLECTOR DEVICE

The present disclosure relates to a deflector device provided on a vehicle roof.

Deflector devices provided on a vehicle roof are conventionally known. A deflector device known from WO 2016/035455 A1 is used in a sunroof device installed in an opening in a vehicle roof. The deflector device comprises a pair of arms, and a deflector main body which is pivoted vertically by means of the pair of arms. The deflector main body comprises a frame constituting a holding member, and a mesh member (flow adjustment member) which is held by said frame. When a lid of the sunroof device is retracted in order to open the opening in the roof, the pair of arms pivot upwards and the mesh member moves above a front edge of the opening. As a result, the mesh member functions as a shield against wind while the opening of the sunroof device is in an open state. When the lid is moved forwards in order to close the opening, the pair of arms move downwards and the mesh member is stowed on the inside of the lid.

In a deflector device such as described in WO 2016/035455 A1, the inventors of the application devised a structure in which a hook portion of a mesh support fixed to an upper portion of the mesh member is held inside the holding member. Specifically, a recess is formed in the holding member and the hook portion is received within the recess. A catch portion protruding inwards is formed on an inner wall of the recess. The hook portion is held within the recess as a result of a tip end (lower end) of the hook portion abutting the catch portion. This makes it possible to suppress detachment of the mesh support from the holding member.

However, when a holding member and a mesh member of the above type are formed in a shape which curves backwards towards the arm portions from a front edge of a roof opening portion, it is difficult to form a recess such as described above across the whole of the holding member (the straight portion and the corner portion).

Specifically, when a holding member having a structure such as described above is molded by means of a die, it is difficult to extract the die at the corner portion, which curves substantially in an "L" shape, in a direction of extension of said corner portion. This is because the direction of extension of the corner portion is nonlinear, so the die cannot be slid in said direction of extension. In this case, as shown in FIG. 10, it is necessary to extract a die 150 in a vertical direction at a corner portion 100, and it is necessary to form an opening 103 for extracting the die, on an upper wall 102 of a recess 101. This means that a through-hole 105 penetrating vertically is formed in the corner portion 100 after molding. Wind passing through this through-hole 105 while a vehicle is traveling causes a problem in that noise (what is known as a whistling sound) is generated.

The present disclosure focuses on this problem and provides a deflector device capable of holding a mesh support across a straight portion and a corner portion of a holding member without a through-hole being formed in the corner portion of the holding member.

Means for Solving the Problem

A first mode constitutes a deflector device for a sunroof device, said deflector device comprising: arms respectively provided at edge portions on both sides in a vehicle width direction of an opening in a vehicle roof, and a deflector main body which is pivoted vertically by means of said arms, characterized in that the deflector main body comprises:

a holding member having a straight portion extending along a front edge of the opening in the roof, and a corner portion which curves backwards towards the arms from said straight portion;

a fabric support which extends along the straight portion and the corner portion of the holding member while also being held inside the holding member; and a flow adjustment member or mesh member which is fixed to the fabric support, a hook portion folded downwards is formed on an upper portion of the fabric support, a corner-side recess, which receives the hook portion and is formed as a concavity in which a cross-sectional shape perpendicular to a direction of extension of the corner portion is open on a lower side, is formed in said corner portion, and a pair of facing inside surfaces of the corner-side recess are configured to pinch and hold the hook portion.

In the first mode, the corner-side recess of the corner portion of the holding member is formed as a concavity which is open on the lower side, but a catch portion on which the hook portion is caught is not formed. It is therefore possible to mold the corner-side recess by extracting a die only on the lower side. This makes it possible to avoid a through-hole being formed in the corner portion and it is thus possible to avoid the generation of noise caused by said through-hole.

The pair of inside surfaces of the corner-side recess are configured to hold the hook portion by pinching said hook portion. It is therefore possible to avoid detachment of the fabric support from the corner-side recess.

A second mode, which is in accordance with the first mode, constitutes a deflector device characterized in that the straight portion is formed with:

a straight-side recess which receives the hook portion and is formed as a concavity in which a cross-sectional shape perpendicular to the direction of extension of the straight portion is open on a lower side; and a catch portion which protrudes from an inside surface of the straight-side recess and is abutted by a tip end of the hook portion.

In the second mode, the catch portion is formed on the straight-side recess of the straight portion of the holding member. The tip end of the hook portion received in the straight-side recess therefore abuts the catch portion in the straight portion. This makes it possible to avoid detachment of the fabric support from the straight-side recess. The straight-side recess has a linear shape so a die can be extracted in the direction of extension of the straight portion (the vehicle width direction). Accordingly, the straight portion can be easily molded even if the catch portion is formed on the straight-side recess.

A third mode, which is in accordance with the second mode, constitutes a deflector device characterized in that, in the holding member, a gap between the pair of inside surfaces of the corner-side recess is smaller than a gap between the pair of inside surfaces of the straight-side recess.

In the third mode, the gap between the pair of inside surfaces of the corner-side recess is smaller than the gap between the pair of inside surfaces of the straight-side recess. The hook portion can therefore be held in a compressed manner by means of the pair of inside surfaces of the corner-side recess. As a result, detachment of the fabric support at the corner portion can be reliably suppressed.

A fourth mode, which is in accordance with any one of the first to third modes, constitutes a deflector device characterized in that the hook portion comprises two thin plate portions which are folded back in such a way as to be adjacent in a thickness direction of the mesh member, and of the two thin plate portions, the thickness of the outside thin plate portion is smaller than the thickness of the inside thin plate portion.

In the fourth mode, the thickness of the outside thin plate portion of the folded-back portion of the hook portion is smaller than the thickness of the inside thin plate portion. This makes it possible to avoid the formation of creases in the fabric support at the corner portion. This matter will be described in detail.

At the corner portion, the required length of the outside thin plate portion is greater than the required length of the inside thin plate portion. This is because the outside thin plate portion is positioned on the outer perimeter of the corner portion. Here, if the thickness of the inside thin plate portion were smaller than the thickness of the outside thin plate portion, the inside thin plate portion would curve in such a way as to lie along the inner surface of the outside thin plate portion having a relatively large thickness. In this case, the actual length of the inside thin plate portion having a relatively small thickness tends to be greater than the required length, and creases readily form in the inside thin plate portion. There is a risk of the fabric support being torn and detaching due to such creases.

In contrast to this, the thickness of the outside thin plate portion according to this mode is smaller than the thickness of the inside thin plate portion. In this case, the outside thin plate portion curves in such a way as to lie along the outer surface of the inside thin plate portion having a large thickness. In this case, it is possible to reduce the difference between the actual length of the inside thin plate portion and the required length, so it is possible to avoid the formation of creases in the inside thin plate portion. Meanwhile, the actual length of the outside thin plate portion tends not to satisfy the required length, and it is also possible to avoid the formation of creases in the outside thin plate portion. As a result, according to this mode, it is possible to suppress the formation of creases in both the outside thin plate portion and the inside thin plate portion, and it is possible to avoid the drawback such as described above.

According to this mode, it is possible to mold the holding member by means of a die, without a through-hole being formed in the corner portion. As a result, it is possible to reliably avoid the generation of noise caused by traveling wind passing through the through-hole. The design properties can furthermore be improved because there is no through-hole in the corner portion.

In the corner portion, the hook portion is pinched and held by means of the pair of inside surfaces of the corner-side recess, so it is possible to avoid detachment of the fabric support at the corner portion.

It is also possible to detach the hook portion from the straight-side recess and the corner-side recess. Replacement and maintenance of the fabric support and a mesh member can therefore be easily performed.

A deflector device 30 according to a mode of embodiment of the present disclosure will be described. It should be noted that, for the sake of convenience in the description given in the present specification, a front side in a vehicle front-rear direction will be referred to as the "front" and a rear side will be referred to as the "rear", and a left side in a vehicle width direction will be referred to as the "left" and a right side will be referred to as the "right".

Figure 1:
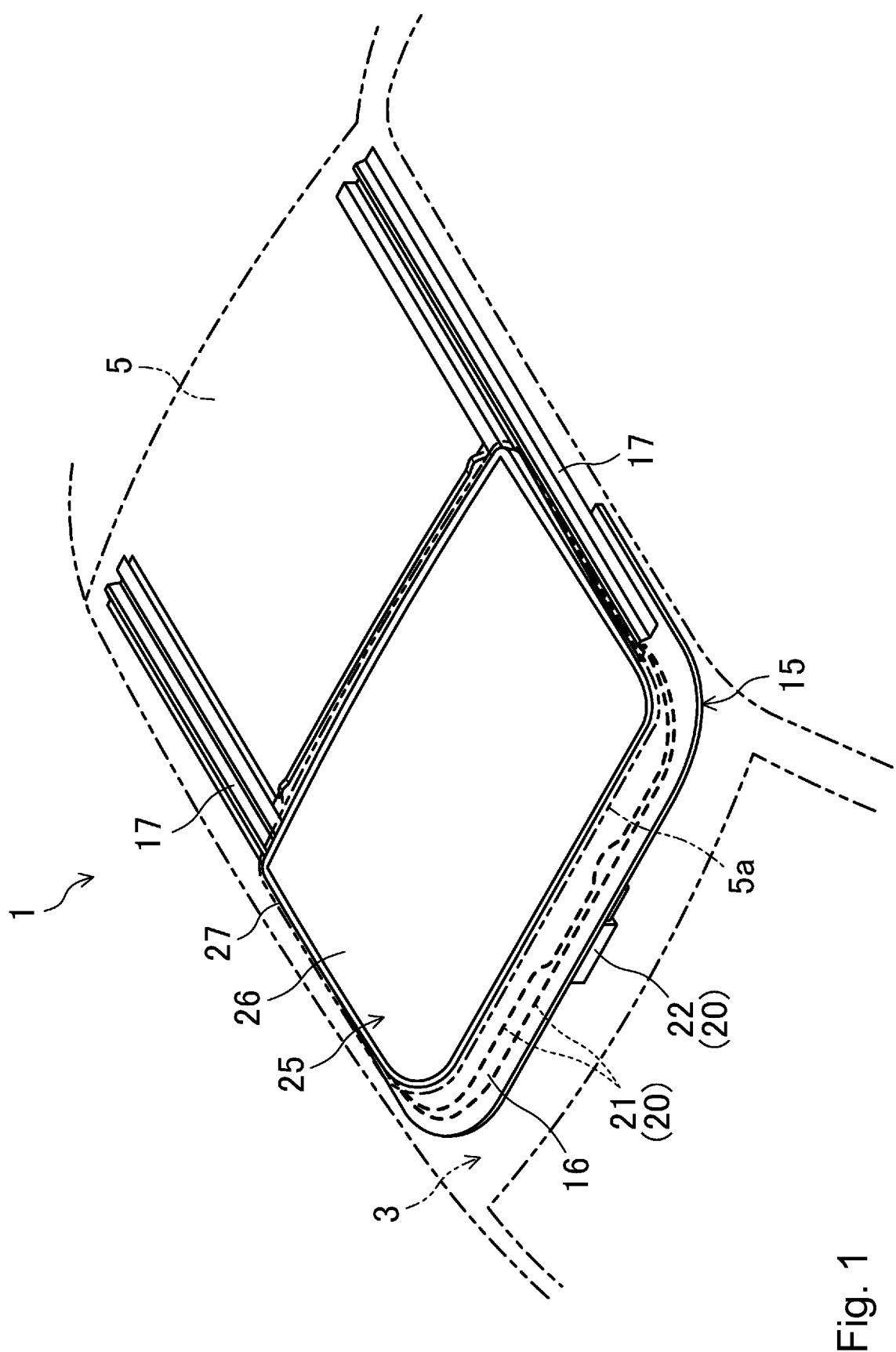
FIG. 1 is an oblique view of a vehicle roof. A lid is in a fully closed state.
Figure 2:
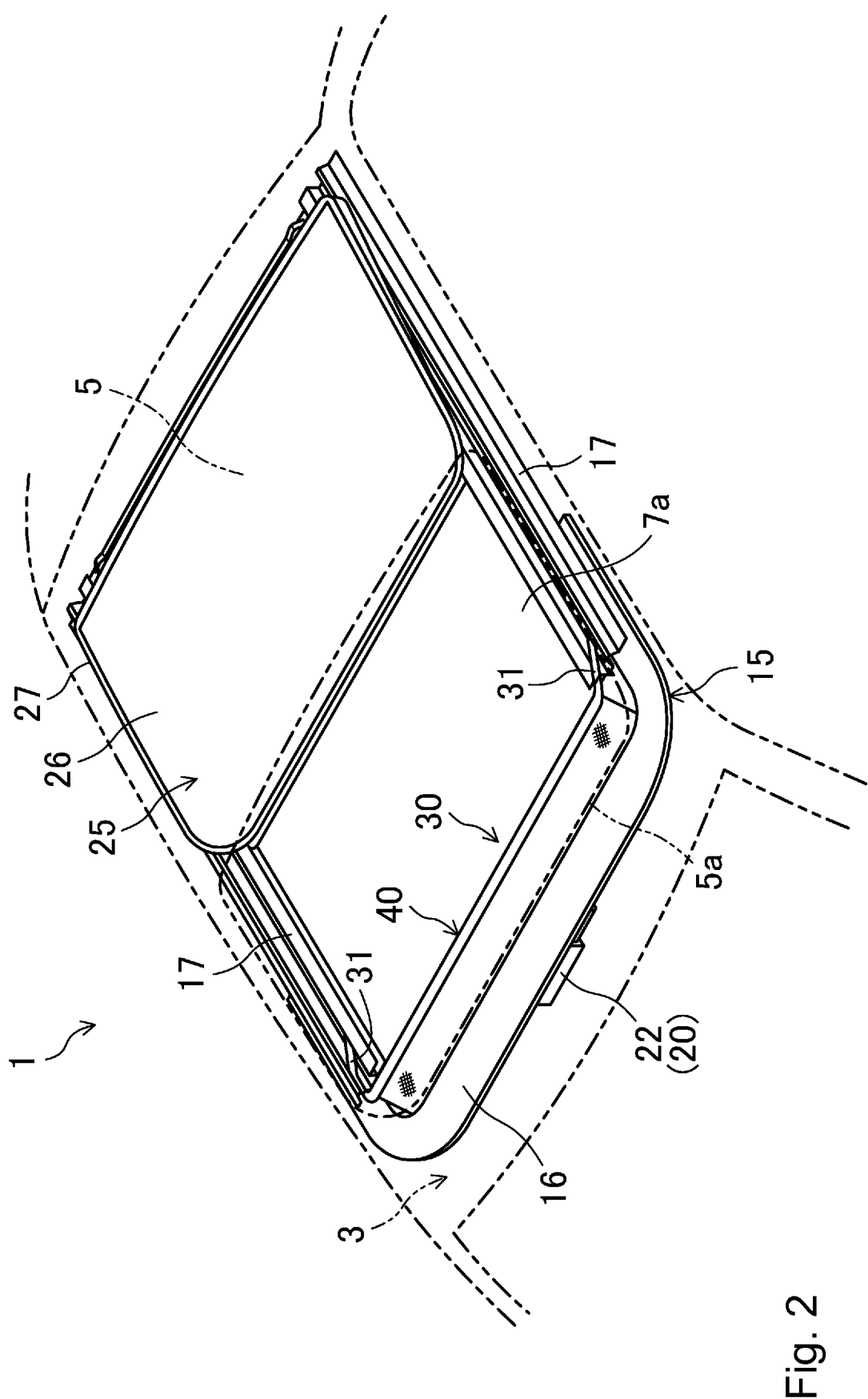
FIG. 2 is an oblique view of the vehicle roof. The lid is in a fully open state.

The deflector device 30 is applied to a sunroof device 1. The sunroof device 1 is mounted on a roof 3 of a vehicle, as shown in FIG. 1 and FIG. 2.

The roof 3 is formed by an outer panel 5, and an inner panel (not depicted) covering said outer panel 5 from inside a vehicle compartment. A space is formed between the outer panel 5 and the inner panel. A substantially rectangular roof opening 5a is formed in the outer panel 5, while a substantially rectangular compartment-internal opening 7a is formed in the inner panel correspondingly with the roof opening 5a in the outer panel 5.

The sunroof device 1 comprises a frame 15 installed on an upper-side (outside) surface of the inner panel, an opening/closing mechanism 20 disposed on a front side of said frame 15, a lid 25 which is driven by means of said opening/closing mechanism 20, and the deflector device 30 which is disposed at a front-end side of the frame 15.

The frame 15 is formed in the manner of a border along an opening edge portion of the compartment-internal opening 7a in the inner panel. The frame 15 comprises: a front-side frame 16 extending in the vehicle width direction on a vehicle width direction front side of the compartment-internal opening; and guide rails 17 attached in such a way as to extend in the front-rear direction on both outer sides of the compartment-internal opening in the vehicle width direction. The two left and right guide rails 17 are configured with left/right symmetry.

The opening/closing mechanism 20 comprises a push-pull cable 21 and a drive motor 22 for driving said push-pull cable 21. The push-pull cable 21 is laid on the front-side frame 16 and both guide rails 17. The push-pull cable 21 is coupled to the lid 25 by way of a slider (not depicted). The drive motor 22 is mounted on the front-side frame 16.

The lid 25 comprises a substantially quadrilateral, transparent glass panel 26, and a weatherstrip 27 provided on a peripheral edge portion of said glass panel 26. The lid 25 opens and closes the roof opening 5a by sliding in a vehicle body front-rear direction. The lid 25 is configured to be movable between the fully closed position shown in FIG. 1 and the fully open position shown in FIG. 2. When the lid 25 is in the fully closed position, a peripheral edge portion of the lid 25 is in tight contact with an opening edge of the roof opening 5a in the outer panel 5. When an operation to open the lid 25 from the fully closed position is started, a rear end portion of the lid 25 sinks downwards from the fully closed position. When the opening operation is continued, the lid 25 in that state moves to the rear. When the lid 25 is in the fully open position, the whole of the lid 25 sinks below the outer panel 5, and the roof opening 5a is opened.

When the lid 25 moves to the rear, a deflector main body 40 of the deflector device 30 is urged upwards by means of elasticity and extends above the front edge of the roof opening 5a (see FIG. 2). The deflector main body 40 in that state functions as a shield against wind. That is to say, the deflector device 30 suppresses the ingress of wind from the roof opening 5a into the vehicle, and reduces wind noise. When the lid 25 is in the fully closed position, the deflector main body 40 is stowed on a lower side of the lid 25.

Figure 3:
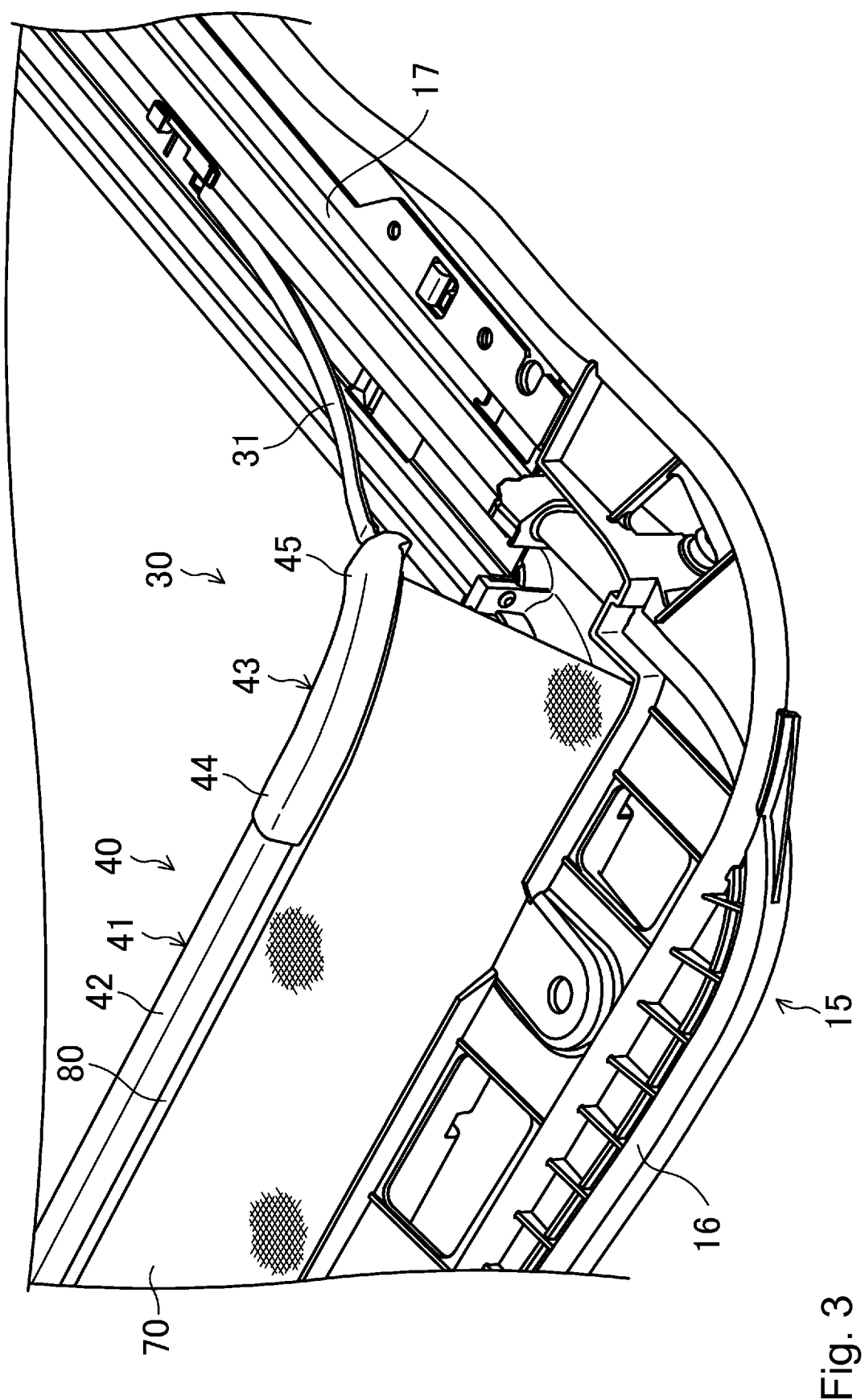
FIG. 3 is an oblique view in which main parts of a frame and a deflector device have been enlarged.

The detailed structure of the deflector device 30 will be described with reference to FIG. 3-FIG. 8. The deflector device 30 comprises a pair of arms 31, and the deflector main body 40 which is pivoted vertically by means of said pair of arms 31. As shown in FIG. 3, a rear end portion of each of the arms 31 is supported by a respective guide rail 17. Front ends of each of the arms 31 are linked to both left and right ends of the deflector main body 40.

The deflector main body 40 extends in the vehicle width direction (left-right direction) along the front-side frame 16 (i.e., the front edge of the roof opening 5a). The deflector main body 40 comprises an upper-side support member 41 and a lower-side support member 60 extending in the vehicle width direction along the front-side frame 16, a flow adjustment member or mesh member 70 held between the upper-side support member 41 and the lower-side support member 60 and a fabric support 80 fixed to an upper portion of the mesh member 70.

Figure 4:
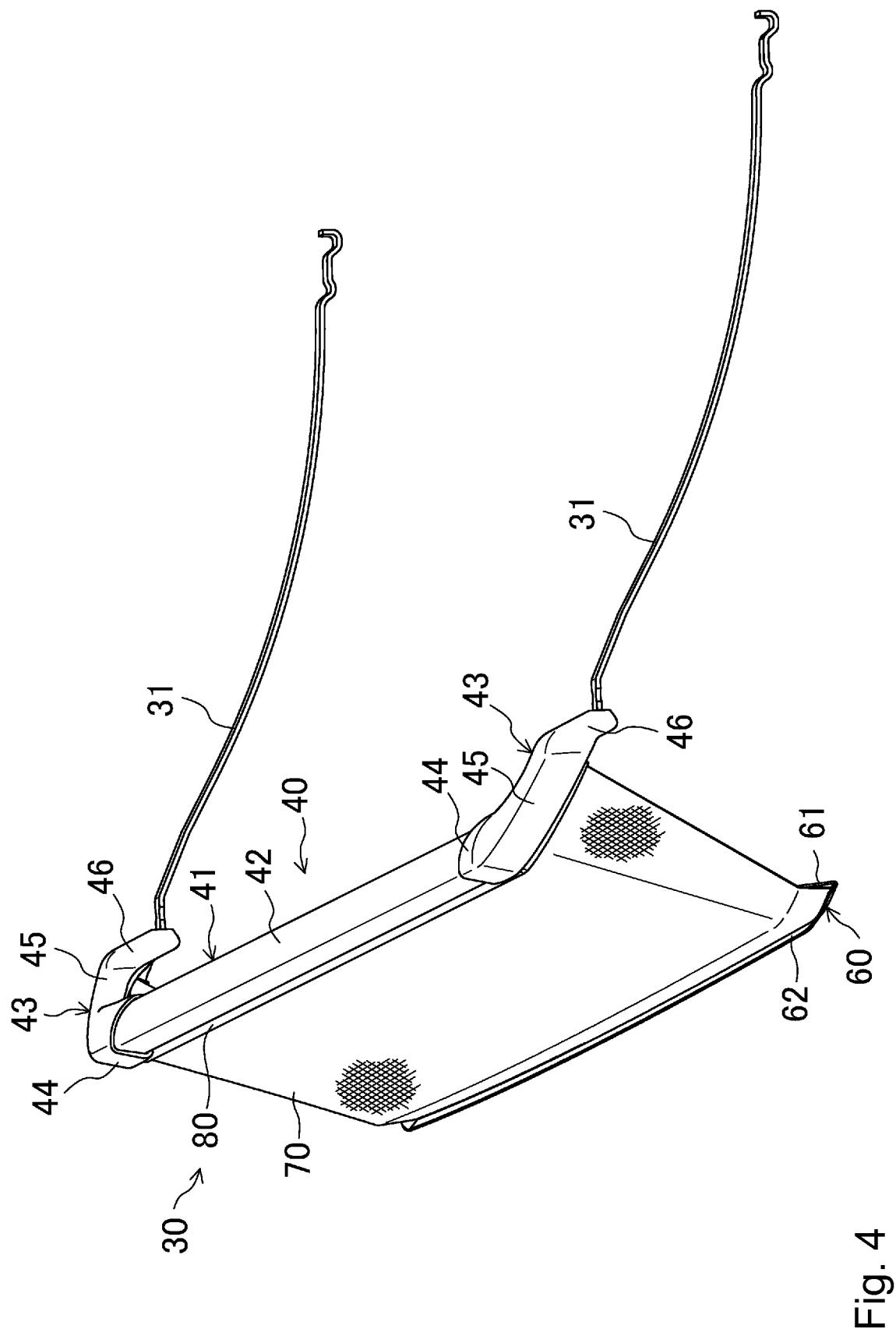
FIG. 4 is an oblique view of the deflector device.
Figure 5:
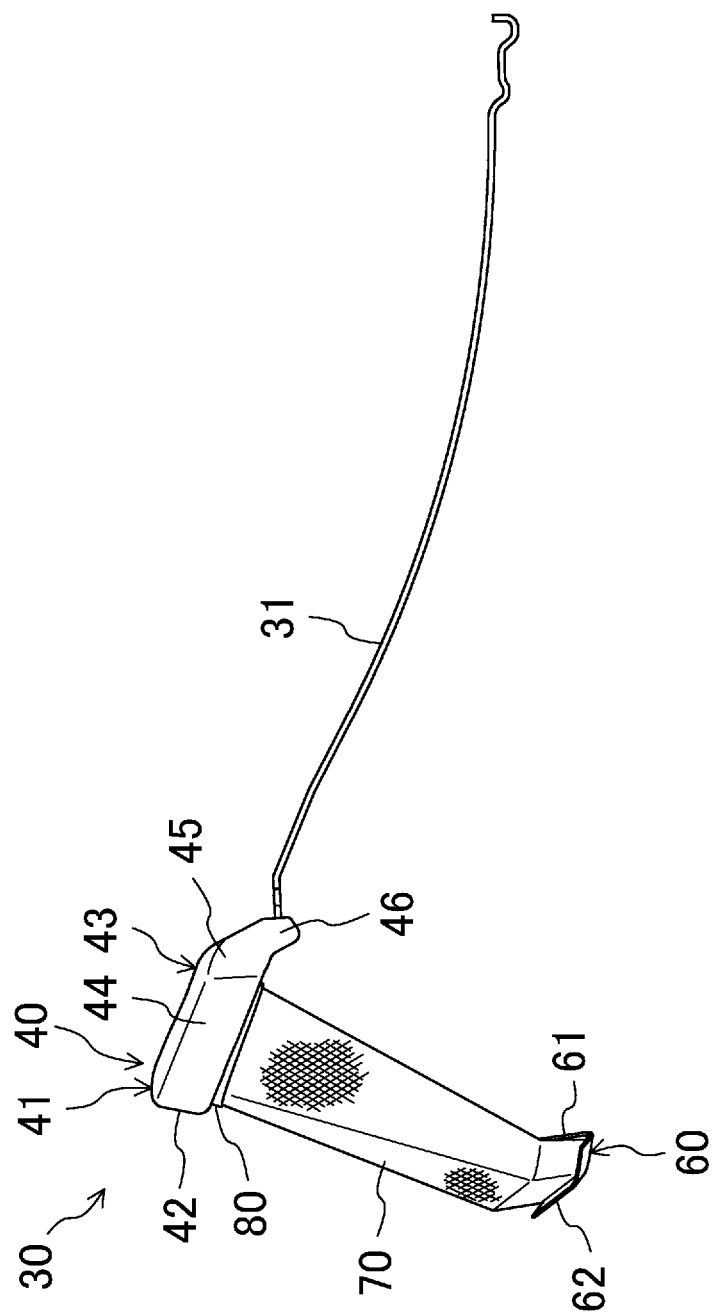
FIG. 5 is a left-side view of the deflector device.
Figure 6:
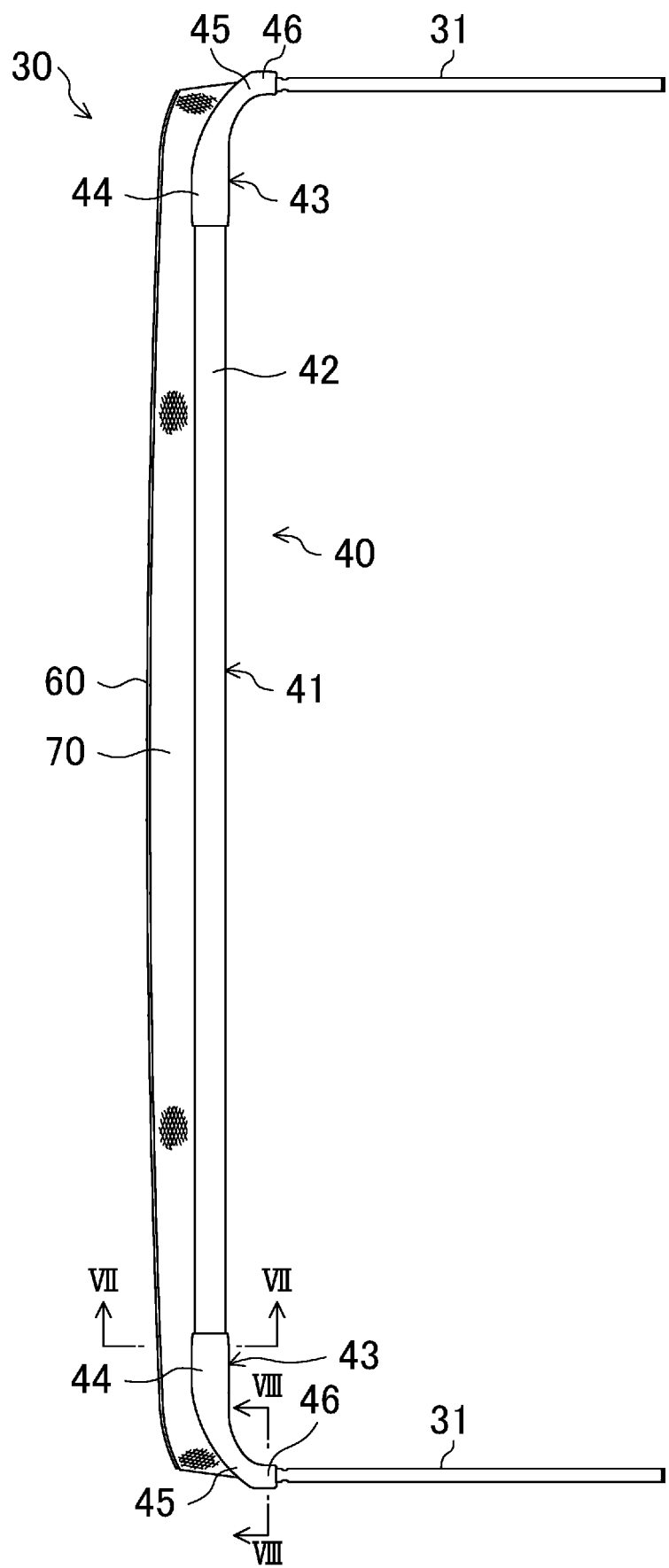
FIG. 6 is a plan view of the deflector device.

As shown in FIG. 4-FIG. 6, the lower-side support member 60 is linked to a lower end of the mesh member 70. The lower-side support member 60 comprises: a fixed plate 61 which is fixed to a back side (rear surface) of the mesh member 70, and a claw portion 62 which is folded upwards on the front side from a lower end of said fixed plate 61. The lower-side support member 60 is fixed to the front-side frame 16 as a result of the claw portion 62 engaging with the front-side frame 16.

The mesh member 70 extends in the vehicle width direction along the front-side frame 16. The mesh member 70 constitutes a flow adjustment member for adjusting the flow of traveling wind. The mesh member 70 is formed by synthetic fibers in which minute air holes are formed, for example.

The fabric support 80 extends in the vehicle width direction along the front-side frame 16, correspondingly with the upper-side support member 41. The fabric support 80 is detachably attached to the upper-side support member 41. In other words, the mesh member 70 is detachably attached to the upper-side support member 41 by way of the fabric support 80. The fabric support 80 is formed by an elastic member which is able to bend.

Figure 7:
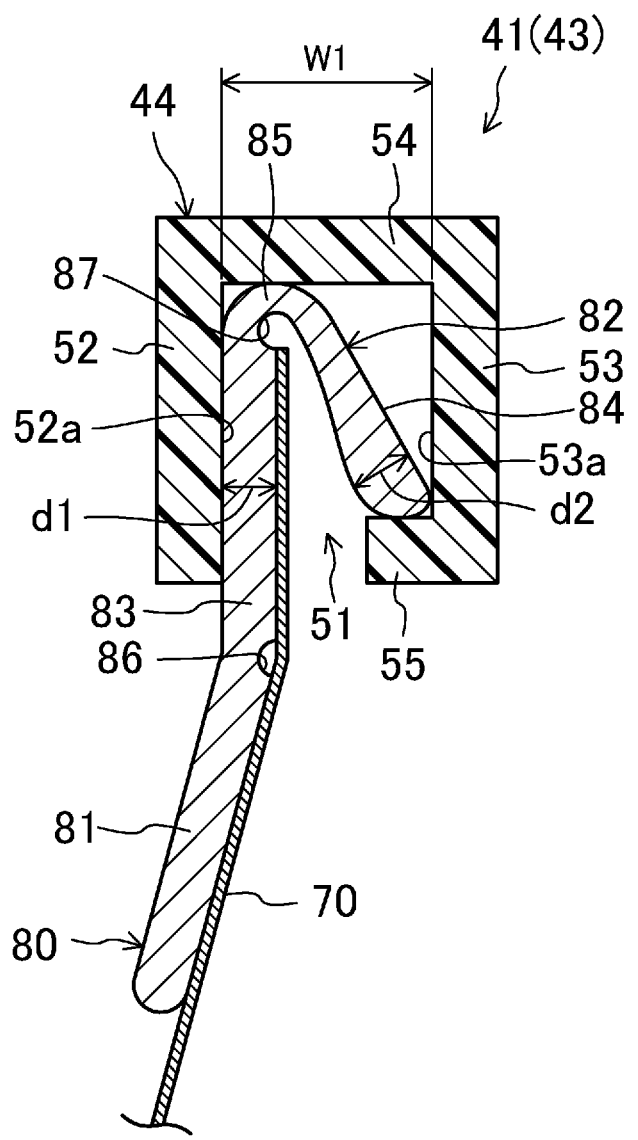
FIG. 7 is a view in cross section along the line VII-VII in FIG. 6.
Figure 8:
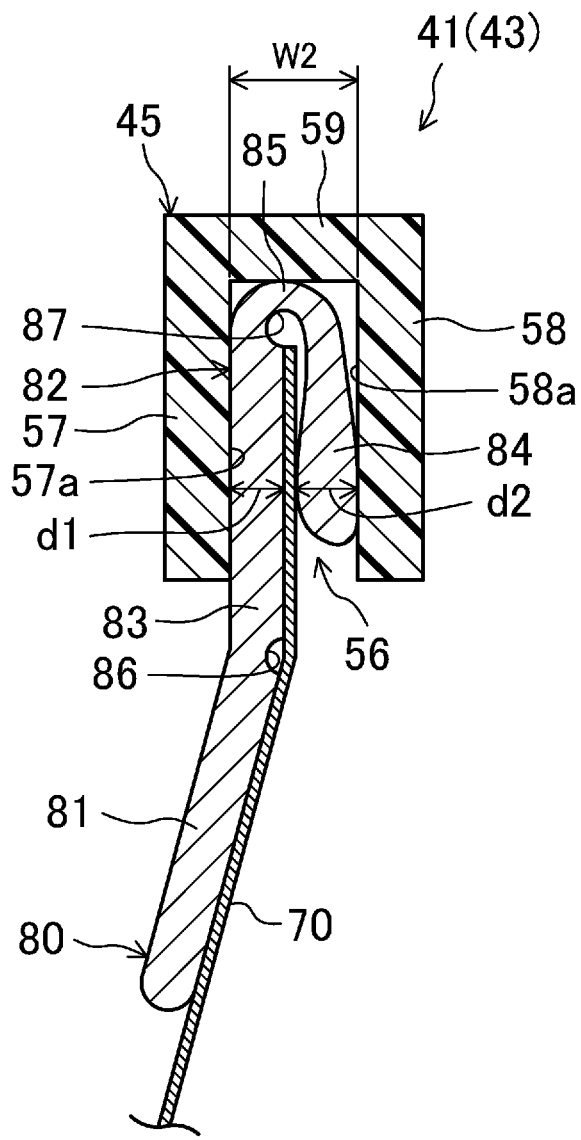
FIG. 8 is a view in cross section along the line VIII-VIII in FIG. 6.

As shown in FIG. 7 and FIG. 8, the fabric support 80 comprises a plate-shaped base portion 81 formed at a lower portion thereof, and a hook portion 82 formed above said base portion 81. The hook portion 82 is formed in a crotchet shape which is folded downwards. The hook portion 82 comprises an outside thin plate portion 83 which is contiguous with an upper end of the base portion 81, an inside thin plate portion 84 which is positioned on a back side of said outside thin plate portion 83, and a linking portion 85 which links an upper end of the outside thin plate portion 83 and an upper end of the inside thin plate portion 84. The outside thin plate portion 83 and the inside thin plate portion 84 are adjacent in a thickness direction of the mesh member 70.

A first groove 86 and a second groove 87 are formed on an inner surface of the fabric support 80. The first groove 86 is formed at the continuation of the base portion 81 and the hook portion 82. The second groove 87 is formed on the linking portion 85. A transverse section of the first groove 86 and the second groove 87 is substantially arc-shaped. Formation of the first groove 86 and the second groove 87 facilitates folding of the fabric support 80 in such a way as to lie along said grooves 86, 87.

The thickness of the outside thin plate portion 83 is roughly equal from top to bottom. The thickness of the inside thin plate portion 84 gradually increases towards the bottom. As shown in FIG. 7 and FIG. 8, the thickness of the outside thin plate portion 83 (to be exact, the maximum thickness d1) is smaller than the thickness of the inside thin plate portion 84 (to be exact, the maximum thickness d2).

As shown in FIG. 3-FIG. 6, the upper-side support member 41 comprises a central frame 42 extending in the vehicle width direction along the front-side frame 16 and a pair of side frames 43 fitted outside both ends of said central frame 42 in the direction of extension thereof (the vehicle width direction). The central frame 42 and the side frames 43 are formed as concavities in which a cross-sectional shape perpendicular to the direction of extension thereof is open on the lower side. The central frame 42 is formed from an extruded aluminum material. It should be noted that the central frame 42 may equally be formed from a synthetic resin. The side frames 43 are formed by resin molded articles which are injection molded in a die. It should be noted that the side frames 43 are formed from a resin material comprising glass fibers. The side frames 43 are integrally molded with the abovementioned arms 31. Furthermore, the rigidity of the side frames 43 is greater than the rigidity of the fabric support 80 which comprises polypropylene.

The side frames 43 constitute the holding member according to the present disclosure. The side frames 43 comprise a straight portion 44 which extends in the vehicle width direction along the front-side frame 16 and a corner portion 45 which curves backwards towards the arm 31 side from said straight portion 44. The width of the straight portion 44 between an outside surface (front surface) and an inside surface (rear surface) thereof is somewhat greater than the width of the central frame 42 and the corner portion 45. The central frame 42 is fitted inside and joined to an interior end portion of the straight portion 44 in the vehicle width direction. The corner portion 45 curves substantially in an "L" shape. A front end of the arm 31 is fitted inside a rear end of the corner portion 45.

A height position of the side frames 43 becomes gradually lower towards the arm 31. An inclined portion 46 which is inclined obliquely downwards towards the rear is formed on a rear portion of the corner portion 45.

FIG. 7 schematically shows a cross section (a cross section along the line VII-VII in FIG. 6) perpendicular to the direction of extension of the straight portion 44. A straight-side recess 51 is formed in the straight portion 44. A cross-sectional shape of the straight-side recess 51 perpendicular to the direction of extension of the straight portion 44 is formed as a concavity which is open on the lower side. The hook portion 82 of the fabric support 80 is received inside the straight-side recess 51. The straight portion 44 comprises a first outer wall 52 formed on the outside thereof (the front side), a first inner wall 53 formed on the inside thereof (the rear side), and a first upper wall 54 lying across an upper end of the first outer wall 52 and an upper end of the first inner wall 53.

A catch portion 55 abutted by a tip end (lower end) of the hook portion 82 of the fabric support 80 is formed on the straight portion 44. The catch portion 55 according to this example is formed at a lower end of the first inner wall 53. The catch portion 55 protrudes inwards in the width direction of the straight portion 44, from an inside surface 53*a* of the first inner wall 53 towards an inside surface 52*a* of the first outer wall 52. The catch portion 55 extends substantially horizontally in such a way as to lie along the direction of extension of the straight portion 44.

It should be noted that the same catch portion as that of the straight portion 44 is also formed inside a recess in the abovementioned central frame 42. Accordingly, the tip end of the hook portion 82 also abuts the catch portion of the central frame 42.

FIG. 8 schematically shows a cross section (a cross section along the line VIII-VIII in FIG. 6) perpendicular to the direction of extension of the corner portion 45. A corner-side recess 56 is formed in the corner portion 45. A cross-sectional shape of the corner-side recess 56 perpendicular to the direction of extension of the corner portion 45 is formed as a concavity which is open on the lower side. The hook portion 82 of the fabric support 80 is received inside the corner-side recess 56.

The corner portion 45 comprises a second outer wall 57 formed on the outside thereof (the front side), a second inner wall 58 formed on the inside thereof (the rear side), and a second upper wall 59 lying across an upper end of the second outer wall 57 and an upper end of the second inner wall 58.

The catch portion 55 is not formed on the corner portion 45, unlike the straight portion 44. That is to say, an inside surface 57*a* of the second outer wall 57 and an inside surface 58*a* of the second inner wall 58 are formed with a flat shape from the upper end to the lower end thereof. In other words, the gap in the width direction of the corner-side recess 56 is roughly equal from the upper end to the lower end.

The width of the corner portion 45 (the length in the left-right direction in FIG. 7 and FIG. 8) is smaller than the width of the straight portion 44. To be exact, W2 is the gap between the pair of facing inside surfaces 57*a*, 58*a* in the corner-side recess 56 of the corner portion 45, and W1 is the gap between the pair of facing inside surfaces 52*a*, 53*a* in the straight-side recess 51 of the straight portion 44. In this case, the gap W2 in the corner-side recess 56 of the corner portion 45 is smaller than the gap W1 in the straight-side recess 51 of the straight portion 44. When the gap W2 is made smaller in this way, the hook portion 82 is compressed in the thickness direction thereof to a greater extent in the corner-side recess 56 than in the straight-side recess 51 (see FIG. 8). In other words, the pair of facing inside surfaces 57*a*, 58*a* of the corner-side recess 56 are configured to pinch and hold the hook portion 82.

The side frame 43 is produced by means of injection molding. Specifically, the molding die is extracted after the straight portion 44 and the corner portion 45 have been injection molded. Here, the die is withdrawn in the direction of extension of the straight portion 44 (the direction of the page in FIG. 7) for said straight portion 44. As a result, it is possible to obtain the straight portion 44 which includes the straight-side recess 51 and the catch portion 55. Meanwhile, the corner portion 45 has a curved shape, so it is not possible to extract the die in the direction of extension of said corner portion 45 (the direction of the page in FIG. 8). However, the catch portion 55 is not formed on the corner portion 45 as it is on the straight portion 44. It is therefore possible to obtain the corner portion 45 having the corner-side recess 56 by withdrawing the die on the lower side in FIG. 8.

As described above, in the side frame 43 according to this mode of embodiment, the catch portion 55 is formed in the straight-side recess 51 of the straight portion 44, while the catch portion 55 is not formed in the corner-side recess 56 of the corner portion 45. The straight portion 44 and the corner portion 45 can therefore be die molded. In the side frame (holding member) according to the comparative example, a through-hole was required at the corner portion in order to extract the die, causing a problem in that traveling wind passes through the through-hole to generate noise. In contrast to this, such a through-hole is not formed in this mode of embodiment so it is possible to prevent noise from being generated. By eliminating such a through-hole, the design properties of the side frame 43 can furthermore be improved.

The gap W2 in the corner-side recess 56 is smaller than the gap W1 in the straight-side recess 51, so the hook portion 82 can be pinched by means of the pair of inside surfaces 52*a*, 53*a*. The hook portion 82 can therefore be adequately held without the hook portion 55 being formed in the corner-side recess 56. As a result, it is possible to reliably avoid detachment of the hook 82 from the upper-side support member 41.

In the abovementioned mode of embodiment, the maximum thickness d1 of the outside thin plate portion 83 in the fold of the hook portion 82 is smaller than the maximum thickness d2 of the inside thin plate portion 84. This makes it possible to avoid the formation of creases in the fabric support 80 at the corner portion 45. This matter will be described in detail.

At the corner portion 45, the required length of the outside thin plate portion 83 is greater than the required length of the inside thin plate portion 84. This is because the outside thin plate portion 83 is positioned on the outer perimeter of the corner portion 45. Here, if the maximum thickness d2 of the inside thin plate portion 84 were smaller than the maximum thickness d1 of the outside thin plate portion 83, the inside thin plate portion 84 would curve in such a way as to lie along the inner surface of the outside thin plate portion 83 having a relatively large thickness. In this case, the actual length of the inside thin plate portion 84 having a relatively small thickness tends to be greater than the required length, and creases readily form in the inside thin plate portion 84. There is a risk of the fabric support being torn and detaching due to such creases.

In contrast to this, the maximum thickness d1 of the outside thin plate portion 83 according to this mode of embodiment is smaller than the maximum thickness d2 of the inside thin plate portion 84, as shown in FIG. 7 and FIG. 8. In this case, the outside thin plate portion 83 curves in such a way as to lie along the outer surface of the inside thin plate portion 84 having a large thickness. In this case, it is possible to reduce the difference between the actual length of the inside thin plate portion 84 and the required length, so it is possible to avoid the formation of creases in the inside thin plate portion 84. Meanwhile, the actual length of the outside thin plate portion 83 tends not to satisfy the required length, and it is also possible to avoid the formation of creases in the outside thin plate portion 83. As a result, according to this mode of embodiment, it is possible to suppress the formation of creases in both the outside thin plate portion 83 and the inside thin plate portion 84, and it is possible to avoid the drawback such as described above.

Figure 9:
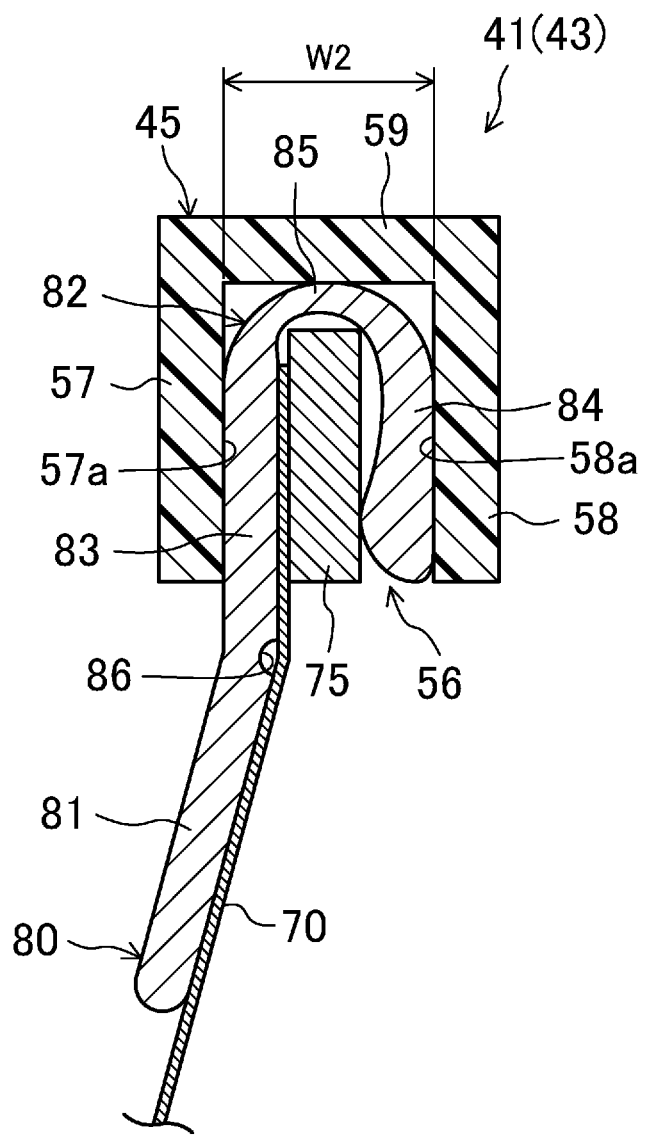
FIG. 9 is a diagram of a deflector device according to a variant example, corresponding to FIG. 8.
Figure 10:
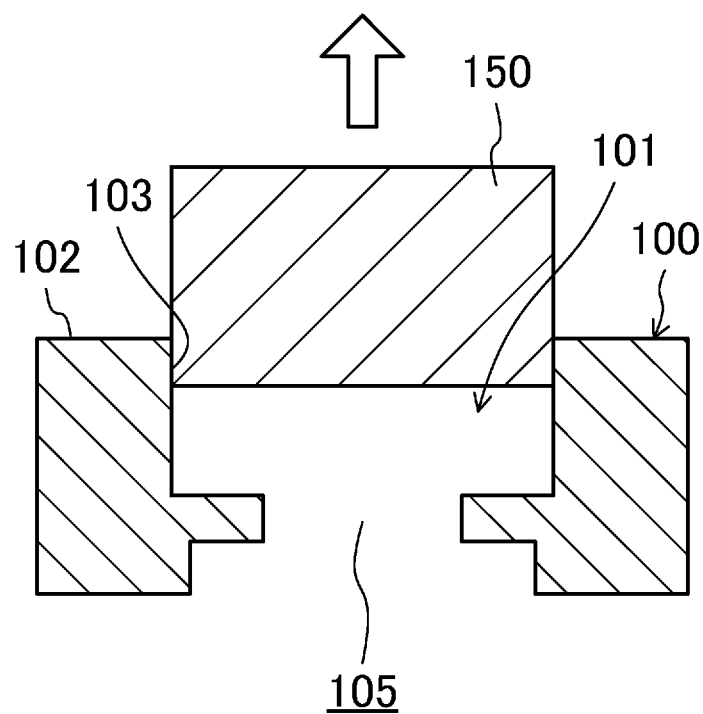
FIG. 10 is a view in longitudinal section of a corner portion of a holding member according to a comparative example, schematically depicting a state in which a die is extracted upwards.

A variant example shown in FIG. 9 differs from the abovementioned mode of embodiment in terms of the configuration of the side frame 43. In the side frame 43 according to the variant example, the width of the corner portion 45 and the width of the straight portion 44 are roughly equal. The gap W2 in the corner-side recess 56 of the corner portion 45 is therefore roughly equal to the gap W1 in the straight-side recess 51 of the straight portion 44.

A plate-shaped spacer 75 is provided in the corner-side recess 56 according to the variant example. The spacer 75 is disposed in such a way as to be inserted between the outside thin plate portion 83 and the inside thin plate portion 84 of the hook portion 82. As a result, the hook portion 82 is compressed in the interior of the corner-side recess 56. That is to say, the pair of inside surfaces 52a, 53a of the corner-side recess 56 holds the hook portion 82 in such a way that it is pinched. As a result, the variant example makes it possible to hold the hook portion 82 even if the gap W2 in the corner-side recess 56 is relatively large.

The flow adjustment member in the abovementioned mode of embodiment constitutes the mesh member 70 having minute air holes. However, the flow adjustment member may equally be a member that does not necessarily have air holes, provided that it is able to adjust the flow of air.

The catch portion 55 in the abovementioned mode of embodiment is formed on the inside surface 53a of the first inner wall 53 of the straight-side recess 51. However, the catch portion 55 may equally be formed on the inside surface 52a of the first outer wall 52, or it may be formed on both of the inside surfaces 52a, 53a.

The holding member may equally have a configuration in which the central frame 42 and the side frames 43 are formed as a single piece.

In the abovementioned mode of embodiment, the maximum thickness d1 of the outside thin plate portion 83 is smaller than the maximum thickness d2 of the inside thin plate portion 84. However, the mean thickness of the outside thin plate portion 83 may equally be smaller than the mean thickness of the inside thin plate portion 84. In this case also it is possible to suppress the formation of creases in the outside thin plate portion 83 and the inside thin plate portion 84.

INDUSTRIAL APPLICABILITY

As described above, the present invention is of use in regard to a deflector device.

LIST OF REFERENCE NUMERALS

1 Sunroof device
3 Roof
5 Outer panel
5a Opening
7a Opening
15 Frame
16 Front-side frame
17 Guide rail
20 Opening/closing mechanism
21 Push-pull cable
22 Drive motor
25 Lid
26 Glass panel
27 Weatherstrip
30 Deflector device
31 Arm
40 Deflector main body
41 Upper side support member
42 Central frame
43 Side frame (holding member)
44 Straight portion
45 Corner portion
46 Inclined portion
51 Straight-side recess
52 First outer wall
52a Inside surface
53 First inner wall
53a Inside surface
54 First upper wall
55 Catch portion
56 Corner-side recess
57 Second outer wall
57a Inside surface
58 Second inner wall
58a Inside surface
59 Second upper wall
60 Lower side support member
61 Fixed plate
62 Claw portion
70 Mesh member (flow adjustment member)
75 Spacer
80 Fabric support
82 Base portion
82 Hook portion
83 Outside thin plate portion
84 Inside thin plate portion
85 Linking portion
86 First groove
87 Second groove
100 Corner portion
101 Recess
102 Upper wall
103 Opening
150 Die

The invention claimed is:

1. A deflector device for a sunroof device, said deflector device comprising:
arms respectively provided at edge portions on both sides in a vehicle width direction of an opening in a vehicle roof, and
a deflector main body which is pivoted vertically said arms,
wherein the deflector main body comprises:
a holding member having a straight portion extending along a front edge of the opening in the roof, and a corner portion which curves backwards towards the arms from said straight portion;
a fabric support which extends along the straight portion and the corner portion of the holding member while also being held inside the holding member; and
a flow adjustment member which is fixed to the fabric support, a hook portion folded downwards is formed on an upper portion of the fabric support,
a corner-side recess, which receives the hook portion and is formed as a concavity in which a cross-sectional shape perpendicular to a direction of extension of the corner portion is open on a lower side, is formed in said corner portion, and
a pair of facing inside surfaces of the corner-side recess are configured to pinch and hold the hook portion; and
wherein the straight portion is formed with
a straight-side recess which receives the hook portion and is formed as a concavity in which a cross-sectional shape perpendicular to the direction of extension of the straight portion is open on a lower side; and
a catch portion which protrudes from an inside surface of the straight-side recess and is abutted by a tip end of the hook portion.

2. The deflector device as claimed in claim 1, wherein, in the holding member, a gap between the pair of in-side surfaces of the corner-side recess is smaller than a gap between the pair of inside surfaces of the straight-side recess.

3. The deflector device as claimed in claim 1, wherein the hook portion comprises two thin plate portions which are folded back in such a way as to be adjacent in a thickness direction of the flow adjustment member, and of the two thin plate portions, the thickness of the outside thin plate portion is smaller than the thickness of the inside thin plate portion.

\* \* \* \* \*